(No Model.)
G. A. WEBER.
ADJUSTING DEVICE FOR SIGNAL OPERATING RODS.
No. 524,429. Patented Aug. 14, 1894.
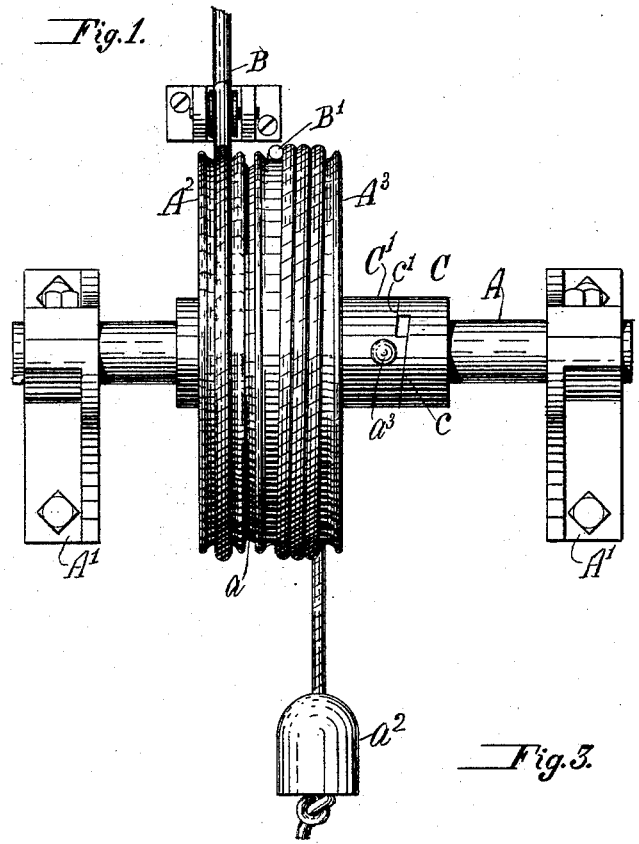
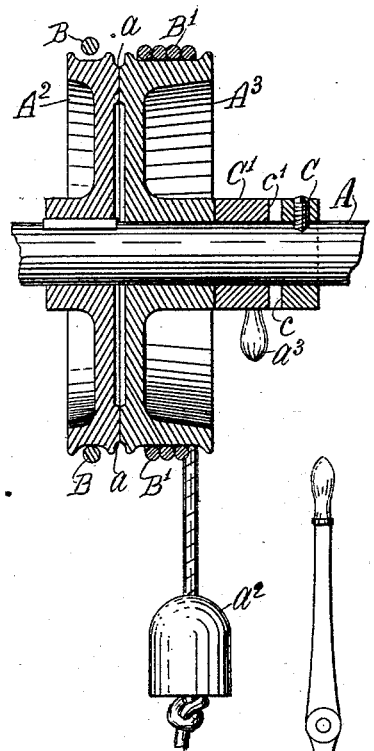
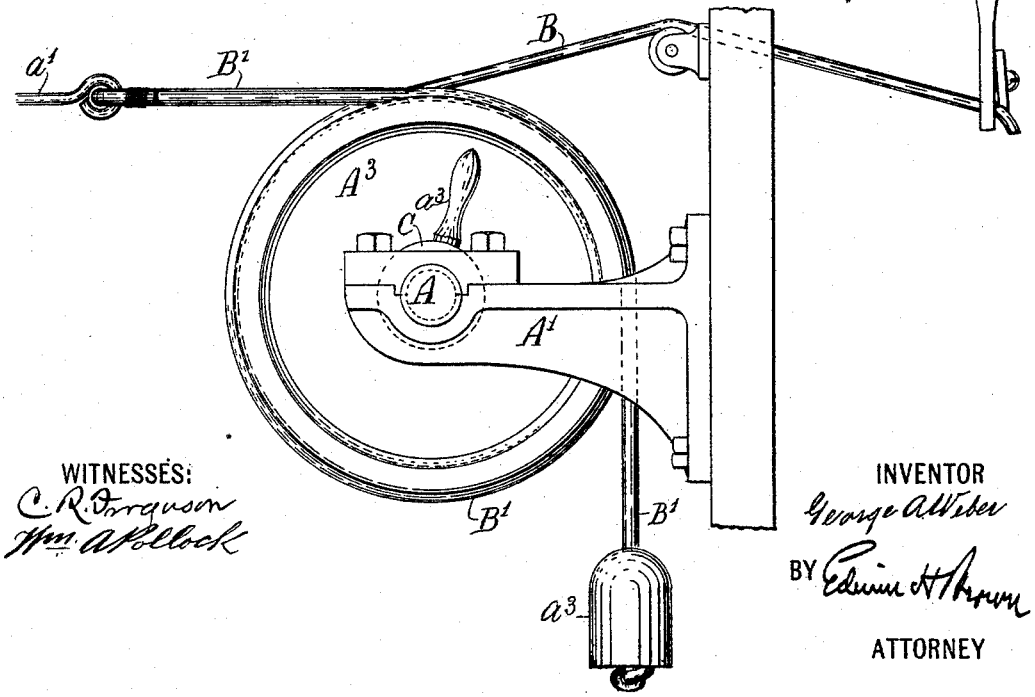
WITNESSES:
C. R. Ferguson
Wm. A. Pollock
INVENTOR
George A. Weber
BY Edwin H. Brown
ATTORNEY

UNITED STATES PATENT OFFICE.

GEORGE A. WEBER, OF NEW YORK, N. Y.

ADJUSTING DEVICE FOR SIGNAL-OPERATING RODS.

SPECIFICATION forming part of Letters Patent No. 524,429, dated August 14, 1894.

Application filed November 21, 1892. Serial No. 452,751. (No model.)

*To all whom it may concern:*

Be it known that I, GEORGE A. WEBER, of New York, county and State of New York, have invented a certain new and useful Improvement in Adjusting Devices for Signal-Operating Rods or Wires, of which the following is a specification.

This invention relates to devices for taking up the slack or releasing the tension of rods or wires extending from a signal station to a signal, such, for instance, as a semaphore, and it consists in the construction and novel arrangement of parts as hereinafter set forth.

I will describe the device and then set forth the novel features in the claims.

In the accompanying drawings Figure 1 is a front elevation of the device showing my improvement. Fig. 2 is a transverse section thereof. Fig. 3 is a side elevation.

Referring by letter to the drawings A designates a shaft having bearings in suitable blocks $A'$.

$A^2$ is a wheel rigidly mounted on the shaft A and having a peripheral groove, and $A^3$ is a similar wheel loosely mounted on the shaft A. On their inner or adjacent surfaces these wheels $A^2$ $A^3$ have annular friction surfaces $a$, which are preferably near the peripheries of the wheels so as to present a greater leverage than would be the case with the friction surfaces near the hubs.

B is a flexible connection secured at one end to the periphery of the wheel $A^2$ and passing partly around said wheel to an operating lever in a signal tower in the ordinary manner.

$B'$ is a flexible cord, chain, or wire, attached at one end to a signal operating rod or wire $a'$, passing two or more times around the wheel $A^3$ and having at its free end a weight $a^2$, which about equals the weight of the signal to be operated.

When operating a signal from the signal tower it is of course necessary to turn the wheel $A^3$ with the wheel $A^2$. I therefore provide means for locking the wheel $A^3$ in frictional contact with the wheel $A^2$. This means, as here shown, consists of a collar C rigidly fixed on the shaft A and having the annular inclined surfaces $c$ on its inner face, and a movable collar $C'$ on the shaft between the collar C and the hub of the wheel $A^3$. The outer surface of the collar $C'$ has annular inclines $c'$ similar to the inclines $c$ of the collar C.

Obviously by rotating the collar $C'$ in one direction the inclined surfaces will cause a movement of the collar $C'$ longitudinally of the shaft A and force the wheel $A^3$ tightly against the wheel $A^2$, so that when the wheel $A^2$ is turned the wheel $A^3$ will also be turned. The normal position of the wheels is in contact but it happens several times a day that the signal operating wire or rod becomes slack. When this occurs it is only necessary for an attendant to turn the collar $C'$ so that the pressure between the wheels $A^2$ $A^3$ is released, then the weight $a^2$ will rotate the wheel $A^3$ to take up the slack without imparting motion to the wheel $A^2$.

A handle $a^3$ may be provided on the collar $C'$ for convenience in turning it.

Having described my invention, what I claim is—

1. In an adjusting device for signal operating rods, or wires, the combination of the shaft, the wheel rigidly mounted thereon and connected with a signal operating lever, the wheel mounted loosely on said shaft and means for moving and holding said wheels together, said loosely mounted wheel being adapted to rotate independently, when not in connection with said rigidly mounted wheel, to take up slack in the said rod or wire, substantially as described.

2. In an adjusting device for signal operating rods or wires, the combination with the shaft of the wheel rigidly mounted thereon, the wheel loosely mounted thereon, means, consisting of the collar having the annular inclines for moving and holding the movable wheel in frictional contact with the other wheel, the flexible connection extending from an operating rod round the loose wheel and a weight on the face end thereof, substantially as specified.

In testimony whereof I have signed my name to this specification in the presence of two subscribing witnesses.

GEO. A. WEBER.

Witnesses:
CLARENCE R. FERGUSON,
ANTHONY GREF.